United States Patent
Suefuji et al.

(10) Patent No.: US 11,689,121 B2
(45) Date of Patent: Jun. 27, 2023

(54) VIBRATION WAVE MOTOR HAVING PRESSING PARTS SEPARATED BY SLITS AND TURNING APPARATUS INCORPORATING THE SAME

(71) Applicant: CANON KABUSHIKI KAISHA, Tokyo (JP)

(72) Inventors: Kei Suefuji, Tokyo (JP); Satoshi Tsuchiya, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 333 days.

(21) Appl. No.: 16/890,532

(22) Filed: Jun. 2, 2020

(65) Prior Publication Data
US 2020/0389101 A1 Dec. 10, 2020

(30) Foreign Application Priority Data
Jun. 7, 2019 (JP) .................................. 2019-107371

(51) Int. Cl.
*H02N 2/10* (2006.01)
*B25J 17/02* (2006.01)
*B25J 9/00* (2006.01)
*G03B 17/56* (2021.01)

(52) U.S. Cl.
CPC .............. *H02N 2/103* (2013.01); *B25J 9/0087* (2013.01); *B25J 17/0258* (2013.01); *G03B 17/561* (2013.01)

(58) Field of Classification Search
CPC ........ H02N 2/103; H02N 2/163; B25J 9/0087; B25J 9/12; B25J 17/0258; G03B 17/561; G03B 2205/0061
See application file for complete search history.

(56) References Cited

U.S. PATENT DOCUMENTS 8,816,568 B2 * 8/2014 Seki ...................... H02N 2/103
310/323.01

FOREIGN PATENT DOCUMENTS

| JP | H0249390 U | 4/1990 |
| JP | 2002195487 A | 7/2002 |
| JP | 2011-254584 A | 12/2011 |
| JP | 2016096712 A | 5/2016 |

* cited by examiner

*Primary Examiner* — Emily P Pham
(74) *Attorney, Agent, or Firm* — Canon U.S.A., Inc. IP Division

(57) ABSTRACT

There is provided a vibration wave motor that includes a plurality of pressing parts separated by slits and can prevent an intervention member from protruding from the slits. The vibration wave motor includes a vibrator, a driven body configured to be brought into pressure contact with the vibrator and to move relative to the vibrator, a pressing member configured to move together with the driven body and to bring the driven body into pressure contact with the vibrator, and an intervention member intervening between the driven body and the pressing member, and configured to be pressed together with the driven body when the pressing member brings the driven body into pressure contact with the vibrator. The pressing member includes a plurality of pressing parts that is separated by slits and presses the intervention member. The intervention member is firmly fixed to the driven body.

5 Claims, 11 Drawing Sheets

VIBRATION WAVE MOTOR HAVING PRESSING PARTS SEPARATED BY SLITS AND TURNING APPARATUS INCORPORATING THE SAME

BACKGROUND OF THE INVENTION

Field of the Invention

The present invention relates to a vibration wave motor, a robot, and a turning apparatus.

Description of the Related Art

A vibration wave motor commonly includes a vibrator on which progressive vibration waves are generated, and a driven body that is brought into pressure contact with the vibrator, and obtains driving force by frictionally driving the driven body by the vibrator on which the progressive vibration waves are generated. The vibration wave motor has a simple and thin configuration, and can perform silent driving with high accuracy. Therefore, the vibration wave motor is applied as a drive motor in a turning driving apparatus such as a camera platform, a production apparatus for factory automation, and an office automation (OA) apparatus (e.g., see Japanese Patent Application Laid-Open No. 2011-254584). FIGS. 11A and 11B illustrate this type of the vibration wave motor.

In FIG. 11A, a vibrator 902 fixed to a base 901 has an annular shape, and a plurality of protrusions 902f is provided over an entire circumference of an upper part (on driven body side) of an elastic body 902b. A piezoelectric ceramic 902a is bonded to a bottom surface (surface on side opposite to driven body side) of the elastic body 902b with an adhesive. At the time of driving the vibration wave motor, when two alternating-current voltages having a phase difference are applied to the piezoelectric ceramic 902a by a drive circuit (not illustrated), progressive vibration waves are generated on the vibrator 902.

A driven body 903 includes an annular rotor 903a made of an elastic member, and a vibration damping member 904.

The rotor 903a includes a supporting part 903b, and a contacting part 903c. The contacting part 903c includes a friction surface that is brought into pressure contact with the protrusions 902f of the vibrator 902. The supporting part 903b and the contacting part 903c have a thickness having a spring property, and can come into stable contact with the vibrator 902.

The vibration damping member 904 includes a vibration damping rubber 904a and an annular spring receiving member 904b. The vibration damping member 904a prevents unnecessary vibration generated on the rotor 903a, and prevents occurrence of noise and reduction of efficiency.

A disk-shaped pressing spring 905 is attached to a top surface (on driven body side) of the vibration damping member 904 with a pressing spring rubber 907 in between.

An inner peripheral part of the pressing spring 905 is attached to a disk 906 that is shrink-fitted to an output shaft 908, and transmits driving force of the driven body 903 to the output shaft 908. The disk 906 is fixed to the output shaft 908 at a position in an axis direction of the output shaft 908 where the pressing spring 905 is displaced to an extent sufficient to bring (rotor 903a of) the driven body 903 into pressure contact with (protrusions 902f of) the vibrator 902 with appropriate force.

As illustrated in FIG. 11B that is a top view of FIG. 11A, the pressing spring 905 includes a plurality of slits 905b on an outer peripheral part such that plate spring parts 905a are individually deformable. Accordingly, it is possible to apply pressing force to (press) the driven body 903 with little unevenness in the outer peripheral part of the pressing spring 905. This allows for stable driving of the vibration wave motor.

The above-described vibration wave motor illustrated in FIGS. 11A and 11B as an existing example, however, has the following issues.

At assembly or installation of an apparatus to which the vibration wave motor is applied, such as a camera platform or an OA apparatus, a driven object connected to the vibration wave motor (output shaft 908) may be adjusted in attitude or changed in position. At this time, external force in a rotational direction may act on the vibration wave motor connected to the driven object, and the vibration wave motor may be forcibly rotated.

More specifically, the base 901 is fixed, the external force in the rotational direction acts on the output shaft 908, and (output shaft 908, disk 906, and driven body 903 of) the vibration wave motor is forcibly rotated. In this case, the pressing spring rubber 907 intervening between the vibration damping member 904 (configuring driven body 903) and the pressing spring 905 may be slid in the rotational direction. Further, the pressing spring 905 may be slid on the pressing spring rubber 907. Further, the pressing spring rubber 907 may protrude (in vertical direction) from the slits 905b of the pressing spring 905.

As a result, the protruding pressing spring rubber 907 may interfere with a device above the vibration wave motor, which may cause malfunction of the device. Further, if the driving is continued while the pressing spring rubber 907 protrudes, the pressing spring rubber 907 may be broken, which may make the rotational transmission of the vibration wave motor unstable, or cause abnormal noise such as squeal.

Against such issues, countermeasures that the slits 905b are eliminated from the pressing spring 905, and the pressing spring is configured by a disk-shaped plate spring or a disc spring not including a slit on the outer peripheral part are considered. When the slits 905b are eliminated from the pressing spring 905, however, the pressing force applied to a specific position (high position) is relatively high in a case where the surface of the pressed object (spring receiving member) contacting the pressing spring 905 is poor in flatness and has a level difference. The issue of protrusion of the pressing spring rubber can be solved by elimination of the slits 905b. However, it is not possible to apply pressing force to (press) the driven body with little unevenness in the outer peripheral part of the pressed object (spring receiving member). Thus, the issue of occurrence of abnormal noise such as squeal cannot be solved.

Further, in the case of the same thickness, if the slits 905b are not provided, the displaceable amount of the pressing spring 905 is small as compared with the case where the slits 905b are provided. Accordingly, when the displacement amount of the pressing spring 905 is reduced due to aging such as abrasion of the vibrator 902 and the rotor 903a, the pressing force applied to the vibration wave motor may be reduced, and stable driving may not be maintained.

SUMMARY OF THE INVENTION

The present invention is directed to a vibration wave motor that includes a plurality of pressing parts separated by slits, and can prevent an intervention member from protruding from the slits.

According to an aspect of the present invention, a vibration wave motor includes a vibrator, a driven body configured to be brought into pressure contact with the vibrator and to move relative to the vibrator, a pressing member configured to move together with the driven body and to bring the driven body into pressure contact with the vibrator, and an intervention member intervening between the driven body and the pressing member, and configured to be pressed together with the driven body when the pressing member brings the driven body into pressure contact with the vibrator. The pressing member includes a plurality of pressing parts that is separated by slits and presses the intervention member. The intervention member is firmly fixed to the driven body.

Further features of the present invention will become apparent from the following description of exemplary embodiments with reference to the attached drawings.

BRIEF DESCRIPTION OF THE DRAWINGS

FIG. 5A is a side enlarged view (diagram viewed from direction A) of the vibration wave motor, and FIG. 5B is a side enlarged view (diagram viewed from direction A) after external force acts on the vibration wave motor.

FIG. 6A is a top view of the vibration wave motor, and FIG. 6B is a side enlarged view (diagram viewed from direction A) of the vibration wave motor.

FIG. 10A is a front view, and FIG. 10B is a side view.

FIG. 11A is a cross-sectional view, and FIG. 11B is a top view.

DESCRIPTION OF THE EMBODIMENTS

Some exemplary embodiments of the present invention are described below.

As a first exemplary embodiment, a configuration example of a rotary vibration wave motor to which the present invention is applied is described with reference to FIGS. 1, 2, and 3.

Figure 1:
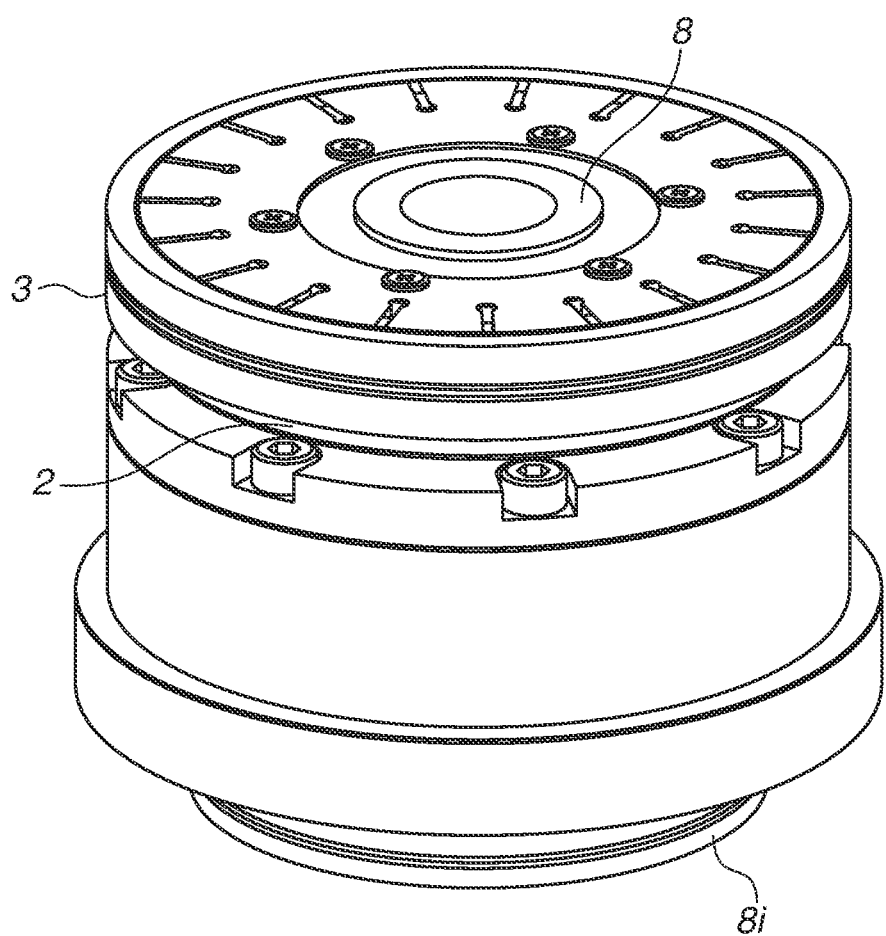
FIG. 1 is a perspective view illustrating a configuration of a vibration wave motor according to a first exemplary embodiment of the present invention.

As illustrated in FIG. 1, the vibration wave motor according to the present exemplary embodiment has a cylindrical shape. An output takeout part 8i of an output unit 8 is coupled to a driven object (not illustrated) to rotationally operate the driven object.

Figure 2:
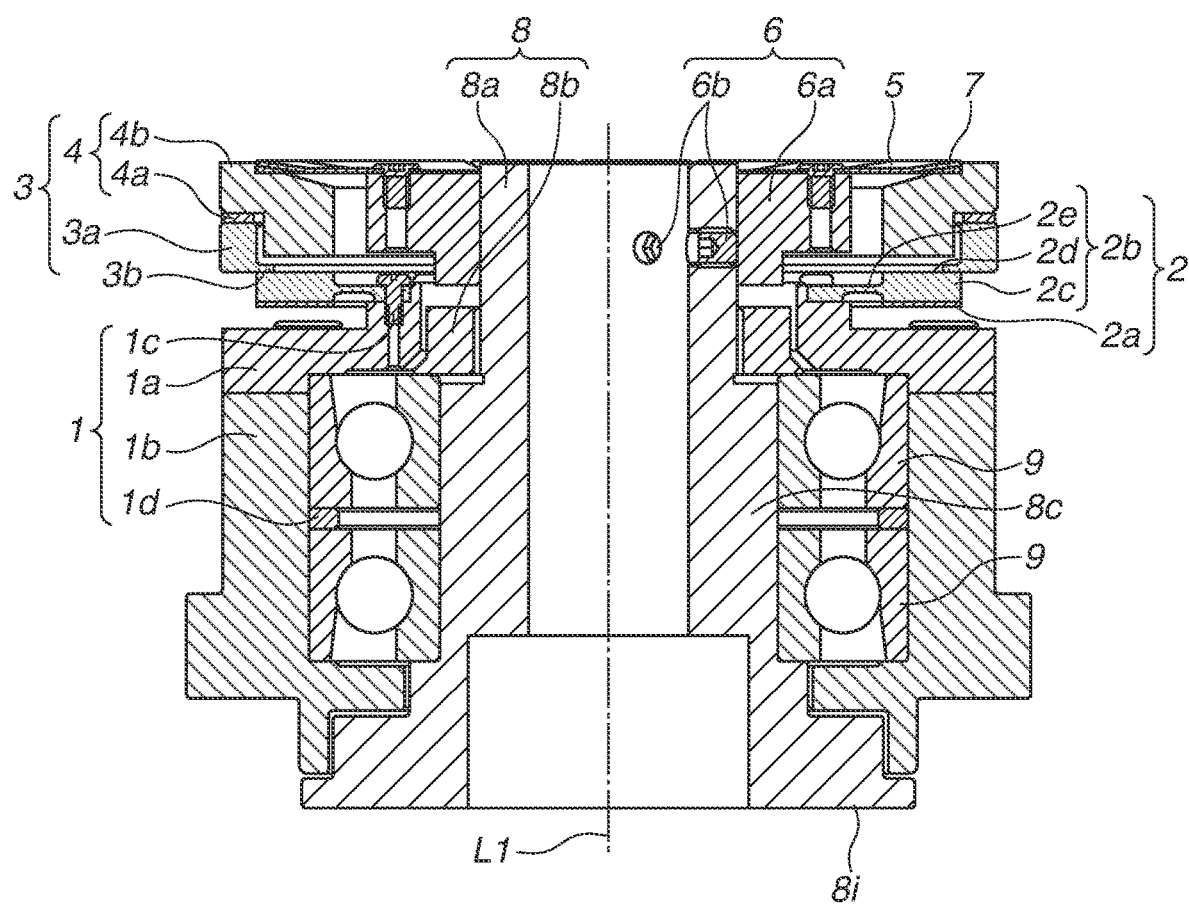
FIG. 2 is a cross-sectional view of the vibration wave motor illustrated in FIG. 1.
Figure 3:
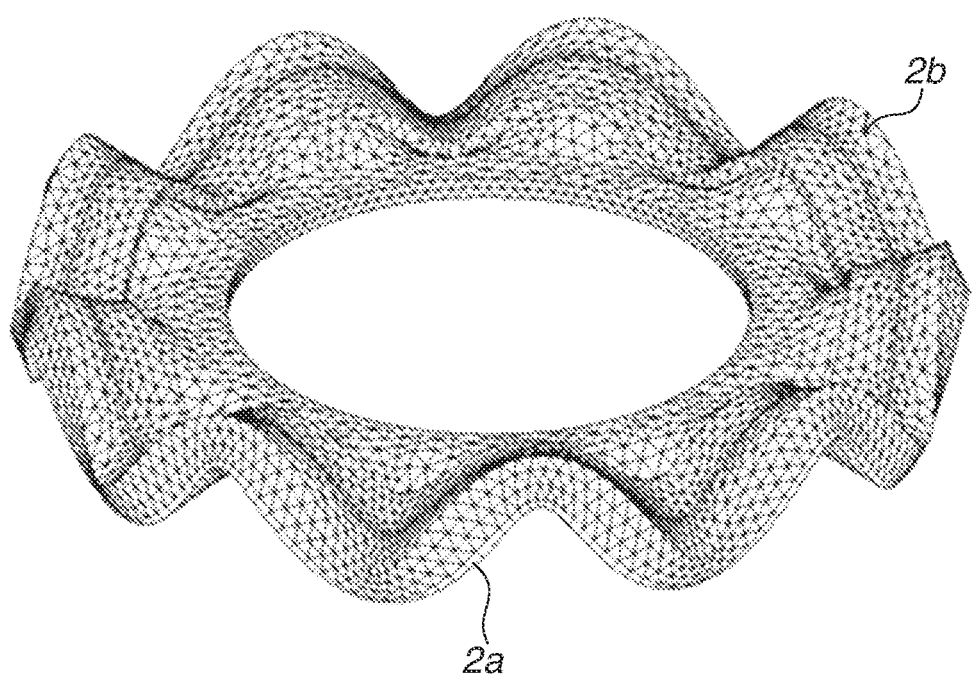
FIG. 3 is a perspective view illustrating a vibration mode made by excitation in a vibrator of the vibration wave motor illustrated in FIG. 1.

FIG. 2 is a cross-sectional view of the vibration wave motor illustrated in FIG. 1. A center axis L1 is a rotation center axis of the vibration wave motor. FIG. 3 is a perspective view illustrating a vibration mode made by excitation in a vibrator of the vibration wave motor in FIG. 1.

In FIG. 2, a vibrator 2 includes a piezoelectric element 2a that is an electromechanical energy transducer converting an electrical amount into a mechanical amount, and an elastic body 2b coupled to the piezoelectric element 2a. When a drive voltage (alternating-current voltage) is applied to the piezoelectric element 2a, elliptical movement is generated on the vibrator 2 by progressive vibration waves by a well-known technology, which relatively rotates a driven body 3 with frictional driving with the vibrator 2. In the present exemplary embodiment, as illustrated in FIG. 3, the driven body 3 is driven by out-of-plane ninth-order vibration that bends in a rotational axis direction and has a ninth-order component in the rotational direction. To facilitate understanding, a displacement amount is highlighted in FIG. 3. In this example, the rotational direction can be rephrased as a relative moving direction in which the driven body moves relative to the vibrator. In the following, "the relative moving direction in which the driven body moves relative to the vibrator" is simply referred to as a "relative moving direction".

The elastic body 2b includes a base part 2c, and a flange part 2e that extends from the base part 2c and fixes the elastic body 2b to a housing 1. The flange part 2e is fastened to a base member 1a of the housing 1 formed in a cylindrical shape, with a fixing screw 1c. A surface of the base part 2c on the driven body 3 side is a sliding surface 2d with the driven body 3. The elastic body 2b is a metal elastic member, and is made of stainless steel in the present exemplary embodiment. As hardening treatment to enhance durability, nitriding treatment is performed on the sliding surface 2d with the driven body 3.

The driven body 3 includes an annular rotor 3a made of an elastic member, and a spring receiving member 4.

The rotor 3a includes a contacting part 3b that has a sliding surface coming into frictional contact with the vibrator 2. In the present exemplary embodiment, the rotor 3a is made of quenched stainless steel. The contacting part 3b has a part with a thickness having a spring property, and can come into stable contact with the vibrator 2.

The spring receiving member 4 includes a vibration damping rubber 4a as a vibration damping member, and a weight member 4b.

The vibration damping rubber 4a has an annular shape, and is made of a butyl rubber, a silicone rubber, or the like, high in vibration damping performance. The weight member 4b is an annular elastic member, and is made of brass in the present exemplary embodiment. The vibration damping rubber 4a and the weight member 4b suppress generation of unnecessary vibration of the rotor 3a while the vibration wave motor is driven, and prevent noise and output reduction of the vibration wave motor.

A pressing spring rubber (intervention member) 7, a pressing spring (pressing member) 5, and a pressing disk 6 are attached to a top surface of the driven body 3. A main component of the pressing spring rubber 7 is a rubber.

The pressing spring 5 is attached to, with a screw, an annular disk member 6a that is fixed to the output unit 8 with a set screw 6b, and transmits the driving force of the driven body 3 to the output unit 8. The pressing spring 5 may be firmly fixed by an adhesive or the like, besides by fastening with the screw. The "firm fixing" indicates that one body is fixed to the other body. The pressing spring 5 may only abut on the disk member 6a as long as the pressing spring 5 can transmit the driving force. In any case, the disk member 6a and the pressing spring 5 abutting on each other are integrally movable in the rotational axis direction. Pressing force acts in the rotational axis direction. In other words, in this example, a pressing direction in which the pressing member 5 presses the intervention member 7 is the same as the rotational axis direction. In the following, "the pressing direction in which the pressing member presses the intervention member" is simply referred to as a "pressing direction".

The output unit 8 includes an output shaft 8a including a bearing attachment part 8c, and a bearing pre-loading member 8b that includes an inner peripheral part screwed with the output shaft 8a.

The output shaft 8a is formed in a hollow shape, and is rotatably supported by two rolling bearings 9 each including an inner ring fitted to an outer peripheral part of the bearing attachment part 8c. In the present exemplary embodiment, each of the rolling bearings 9 includes an angular ball bearing.

An outer ring of each of the rolling bearings 9 is fitted to the base member 1a and a holder member 1b of the housing 1, and is fixed to the housing 1. A spacer 1d is provided between the two rolling bearings 9.

The inner ring of each of the rolling bearings 9 receives preload because the bearing pre-loading member 8b is screwed with the output shaft 8a with appropriate fastening torque. Accordingly, backlash of the rolling bearings 9 in a radial direction is suppressed, and vibration of the output shaft 8a in the radial direction can be suppressed.

Figure 4A:
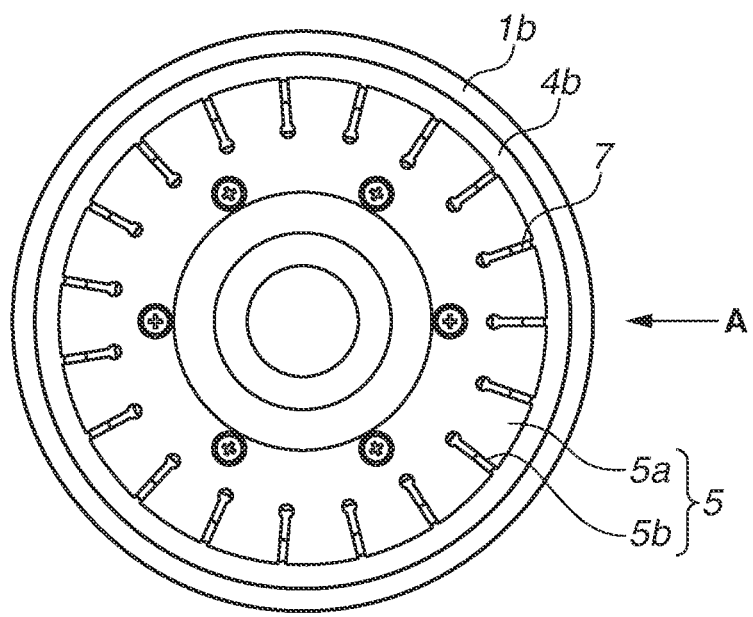
FIG. 4A is a top view of the vibration wave motor illustrated in FIG. 1.
Figure 4B:
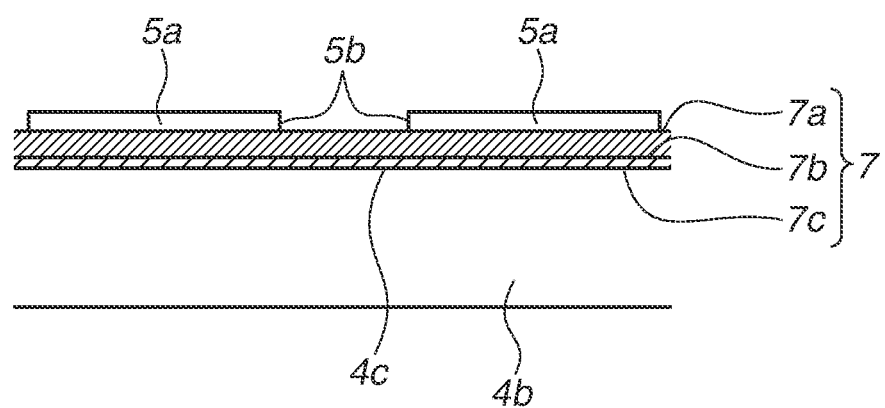
FIG. 4B is a side enlarged view (diagram viewed from direction A) of the vibration wave motor.

FIG. 4A is a top view of the vibration wave motor illustrated in FIG. 2. FIG. 4B is a side enlarged view (diagram viewed from direction A) of the vibration wave motor as viewed from an arrow A in FIG. 4A.

In FIGS. 4A and 4B, the pressing spring 5 is made of an elastic member, and includes plate spring parts 5a and a plurality of slits 5b provided in the rotational direction of the vibration wave motor. In the present exemplary embodiment, the pressing spring 5 is made of a stainless steel strip for spring such as SUS301-CSP and SUS304-CSP, and hardness thereof is enhanced by thermal refining. Further, shapes of an inner diameter and an outer diameter and the slits 5b are formed by etching processing. The pressing spring 5 has a thickness that can sufficiently secure displacement within a range not exceeding proof stress against the pressing force.

The plurality of plate spring parts 5a provided in the rotational direction of the pressing spring 5 is independently deformable by the slits 5b provided from the inner diameter side to an outer diameter end of the pressing spring 5. Accordingly, as compared with the disc spring, which is integrally formed in the rotational direction, with no slit 5b, or the like, the pressing spring 5 can alleviate the influence of a level difference such as flatness of a surface of a pressed object contacting with the pressing spring 5, and can uniformly apply the pressing force without unevenness in the rotational direction. Further, since the plate spring parts 5a are independently deformable, the pressing spring 5 can be largely displaced as compared with the disk-shaped plate spring or the disc spring with the same thickness and no slit 5b. Accordingly, even if the deformation amount of the pressing spring 5 is increased or decreased due to aging such as abrasion of the vibrator 2 and the rotor 3a, it is possible to suppress the change of the pressing force applied to the vibration wave motor, and to maintain stable driving.

The pressing spring rubber 7 is provided between the pressing spring 5 and the weight member 4b of the driven body 3 in the pressing direction, and a top surface 7a of the pressing spring rubber 7 abuts on the pressing spring 5. The top surface 7a of the pressing spring rubber 7 is not in contact with the pressing spring 5 in areas of the slits 5b of the pressing spring 5. In other words, the top surface 7a of the pressing spring rubber 7 includes an area contacting with the pressing spring 5 and an area not contacting with the pressing spring 5, in the rotational direction of the vibration wave motor.

The pressing spring rubber 7 is made of a butyl rubber, a chloroprene rubber, or the like. Elastic deformation of the pressing spring rubber 7 alleviates influence of flatness of a top surface 4c of the weight member 4b where the pressing spring rubber 7 is provided. Accordingly, the pressing force from the pressing spring rubber 7 and the pressing spring 5 is uniformly applied to the driven body 3 without unevenness in the rotational direction, and stable contact between the vibrator 2 and the driven body 3 is maintained.

An adhesive is applied to a bottom surface 7b of the pressing spring rubber 7 over the entire circumference in the rotational direction, an adhesive part 7c is formed between the bottom surface 7b and the weight member 4b, and the spring rubber 7 (intervention member) and the weight member 4b (driven body) are firmly fixed. Fixing force (fixing force between intervention member and driven body) of the adhesive part 7c in the rotational direction (relative moving direction) is larger than friction force (friction force between pressing member and intervention member) in the rotational direction between the pressing spring 5 and the top surface 7a of the pressing spring rubber 7 abutting on the pressing spring 5. Further, the fixing force is larger than friction force between the vibrator 2 and the driven body 3 in the relative moving direction.

As a result, even if the external force forcibly rotating the vibration wave motor acts on the driven body 3, the pressing spring rubber 7 is hardly slid in the rotational direction before the driven body 3 rotates relative to the vibrator 2. Likewise, when the external force acts, the pressing spring rubber 7 is hardly slid in the rotational direction relative to the driven body 3 before the pressing spring 5 rotates relative to the pressing spring rubber 7. Accordingly, it is possible to prevent the pressing spring rubber 7 from protruding from the slits 5b of the pressing spring 5 when the external force acts, as the issue in the existing structure, which makes it possible to maintain stable pressing of the vibration wave motor.

Figure 5A:
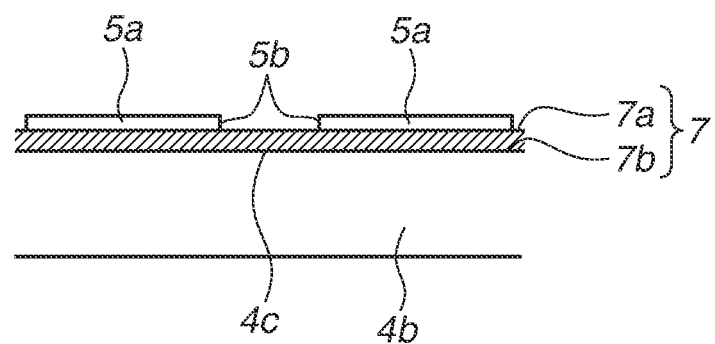
FIGS. 5A and 5B are diagrams illustrating a configuration of a vibration wave motor according to a comparative example of the first exemplary embodiment of the present invention, where
Figure 5B:
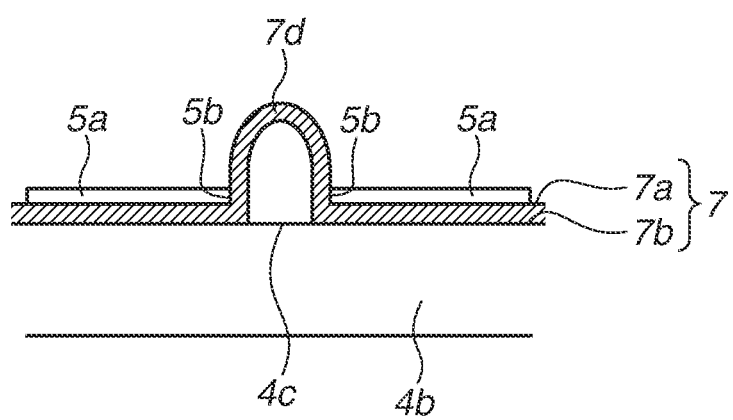

As a comparative example, FIG. 5A illustrates a side enlarged view of the existing vibration wave motor in which the pressing spring rubber 7 is not firmly fixed to the weight member 4b, and FIG. 5B illustrates a side enlarged view after the external force acts on the vibration wave motor of FIG. 5A.

As illustrated in FIGS. 5A and 5B, in a case where the adhesive part 7c is not provided on the bottom surface 7b of the pressing spring rubber 7, the bottom surface 7b of the pressing spring rubber 7 is brought into tight contact with the weight member 4b by the pressing force of the pressing spring 5. Accordingly, the driven body 3, the pressing spring rubber 7, and the pressing spring 5 are integrally rotatable by the friction force caused by the pressing force.

At this time, the friction force between the pressing spring rubber 7 and the weight member 4b in a region where the plate spring parts 5a of the pressing spring 5 abut on the pressing spring rubber 7 is high, whereas the friction force between the pressing spring rubber 7 and the weight member 4b in regions below the slits 5b where the plate spring part 5a does not abut on the pressing spring rubber 7 is small.

In this case, when the external force in the rotational direction acts on the vibration wave motor, moment in the rotational direction acts on the pressing spring rubber 7, which generates an area with high pressing force and an area with low pressing force depending on the rotational direction. Accordingly, the pressing spring rubber 7 may expand in the rotational direction, and the pressing spring rubber 7 in the region near each of the slits 5b where the friction force is low may be slid to or separated from the weight member 4b. As a result, as illustrated in FIG. 5B, the pressing spring rubber 7 protrudes from the slits 5b of the pressing spring 5 in the pressing direction, and protrusion parts 7b are formed. Accordingly, pulling force may act on the pressing spring rubber 7. If the vibration wave motor is continuously driven in that state, the pressing spring rubber 7 is broken, which may make rotational transmission unstable or generate abnormal noise such as squeal.

In the present exemplary embodiment, since the pressing spring rubber 7 and the weight member 4b are firmly fixed with the adhesive part 7c over the entire circumference, the pressing spring rubber 7 hardly expands even when the moment in the rotational direction acts on the pressing spring rubber 7. Further, even in the area where the plate spring 5a does not abut on the pressing spring rubber 7, the pressing spring rubber 7 is hardly slid to or separated from the weight member 4b.

Accordingly, even when the external force in the rotational direction forcibly acts on the vibration wave motor at assembly of the apparatus to which the vibration wave motor is applied, it is possible to prevent the pressing spring rubber 7 from protruding in the pressing direction from the slits 5b of the pressing spring 5, and to maintain stable pressing of the vibration wave motor.

Note that, in the present exemplary embodiment, the driving vibration of the vibrator 2 is out-of-plane ninth-order driving vibration; however, the driving vibration is not limited thereto, and the order and the bending direction are appropriately selectable.

Further, the adhesive part 7c of the pressing spring rubber 7 is not limited to adhesion by the adhesive, and an adhesive by a double-sided adhesive tape provided on the pressing spring rubber 7 may be used as long as the pressing spring rubber 7 and the weight member 4b are firmly fixed over the entire circumference in the rotational direction.

As a second exemplary embodiment, a configuration example of a vibration wave motor in a mode different from the mode according to the first exemplary embodiment is described with reference to FIGS. 6A and 6B. The configuration according to the present exemplary embodiment is different from the configuration according to the first exemplary embodiment in that the pressing spring and the pressing spring rubber have a structure illustrated in FIGS. 6A and 6B. The other elements according to the present exemplary embodiment are the same as the corresponding elements according to the first exemplary embodiment described above. Accordingly, description of the elements is omitted by assigning the same reference numerals to the elements.

Figure 6A:
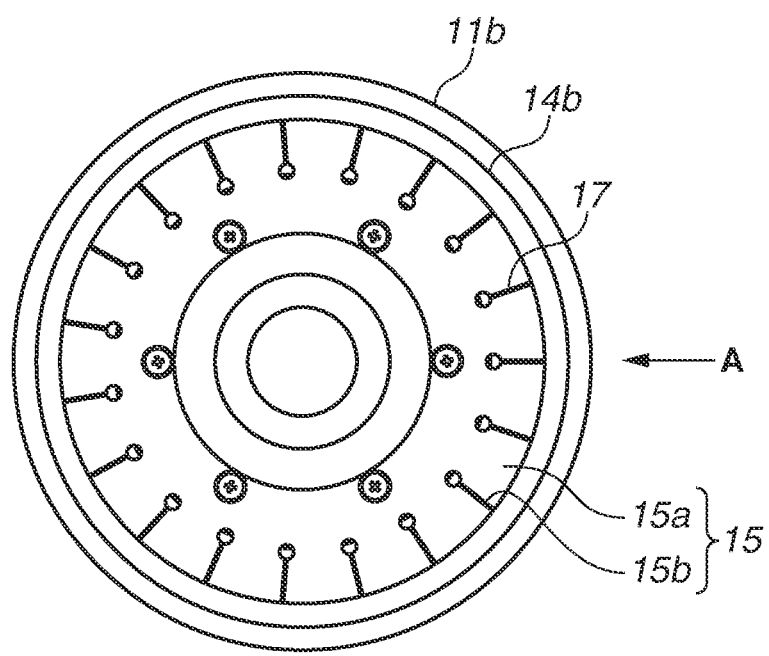
FIGS. 6A and 6B are diagrams illustrating a configuration of a vibration wave motor according to a second exemplary embodiment of the present invention, where

FIG. 6A is a top view of the vibration wave motor according to the present exemplary embodiment. FIG. 6B is a side enlarged view (diagram viewed from direction A) of the vibration wave motor as viewed from an arrow A in FIG. 6A.

Figure 6B:
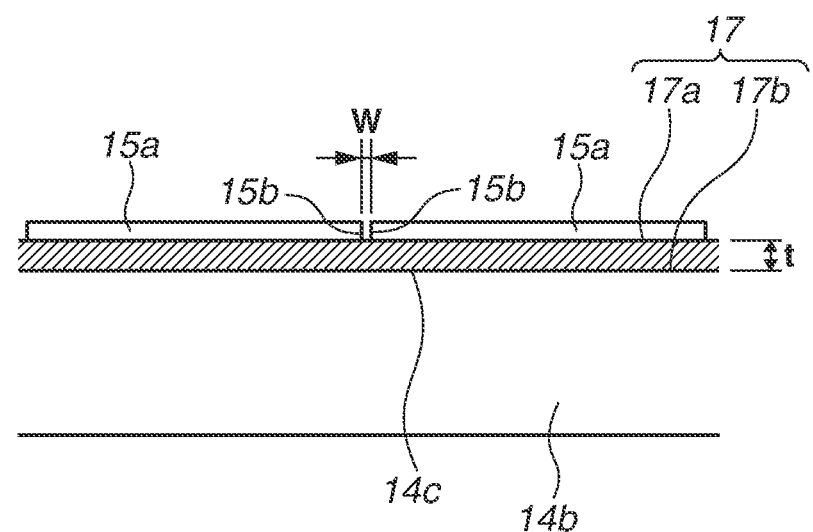

In FIGS. 6A and 6B, a pressing spring 15 is made of an elastic member, and includes plate spring parts 15a and a plurality of slits 15b provided in the rotational direction of the vibration wave motor.

A pressing spring rubber 17 is provided between the pressing spring 15 and a weight member 14b of a driven body 13 in the pressing direction, and a top surface 17a of the pressing spring rubber 17 abuts on the pressing spring 15. A bottom surface 17b of the pressing spring rubber 17 is in tight contact with the weight member 14b without through an adhesive, etc. Accordingly, the driven body 13, the pressing spring rubber 17, and the pressing spring 15 are integrally rotatable by friction force caused by pressing force.

A width (distance) W of each of the slits 15b of the pressing spring 15 in the rotational direction is made less than twice a thickness t of the pressing spring rubber 17 in the pressing direction. This is because, as illustrated in FIG. 5B, protrusion and folding of the pressing spring rubber 17 occur when each of the slits 15b of the pressing spring 15 has a width of at least twice the thickness t of the pressing spring rubber 17, and the pressing spring rubber 17 does not protrude when the width W of each of the slits 15b of the pressing spring 15 is made less than twice the thickness t. Note that the thickness t of the pressing spring rubber is a thickness of the rubber before pressing force is applied. Further, the thickness t of the pressing spring rubber is also a thickness at a part overlapped with each of the slits in the pressing direction.

As a result, even if the external force forcibly rotating the vibration wave motor acts on the driven body 13 and the pressing spring rubber 17 is slid in the rotational direction, it is possible to prevent the pressing spring rubber 17 from protruding from the slits 15b because the width of each of the slits 15b is narrow. This makes it possible to maintain stable pressing of the vibration wave motor.

Also in the present exemplary embodiment, the plurality of plate spring parts 15a provided in the rotational direction of the pressing spring 15 is independently deformable by the slits 15b provided in the pressing spring 15. Further, since the slits 15b are provided over the outer diameter end even though the width W of each of the slits 15b is small, the deformation amount of the pressing spring 15 is sufficiently large. Accordingly, it is possible to alleviate influence of the level difference such as flatness of the surface of the pressed object contacting the pressing spring 15, and to uniformly apply the pressing force without unevenness in the rotational direction. In addition, change of the pressing force due to aging can be suppressed, which makes it possible to maintain stable driving.

As a third exemplary embodiment, a configuration example of a vibration wave motor in a mode different from the modes according to the above-described exemplary embodiments is described with reference to FIGS. 7A and 7B. The present exemplary embodiment is different from the first exemplary embodiment in that the driven body, the pressing spring, and the pressing spring rubber have a structure illustrated in FIGS. 7A and 7B. The other elements according to the present exemplary embodiment are the same as the corresponding elements according to the first exemplary embodiment described above. Accordingly, description of the elements is omitted by assigning the same reference numerals to the elements.

Figure 7A:
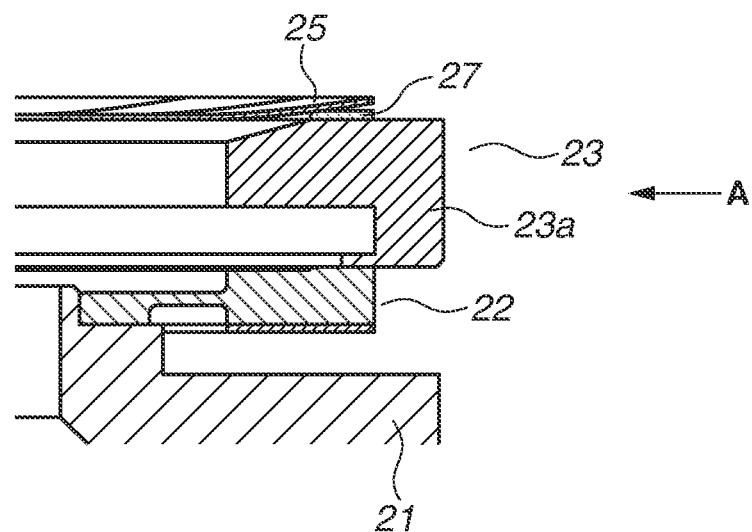
FIGS. 7A and 7B are side enlarged views of a vibration wave motor according to a third exemplary embodiment of the present invention.

FIG. 7A is a partial cross-sectional view (cross-sectional view taken along line B-B) illustrating a part of the vibration wave motor according to the present exemplary embodiment in an enlarged manner. FIG. 7B is a side enlarged view (diagram viewed from direction A) of the vibration wave motor as viewed from an arrow A in FIG. 7A.

Figure 7B:
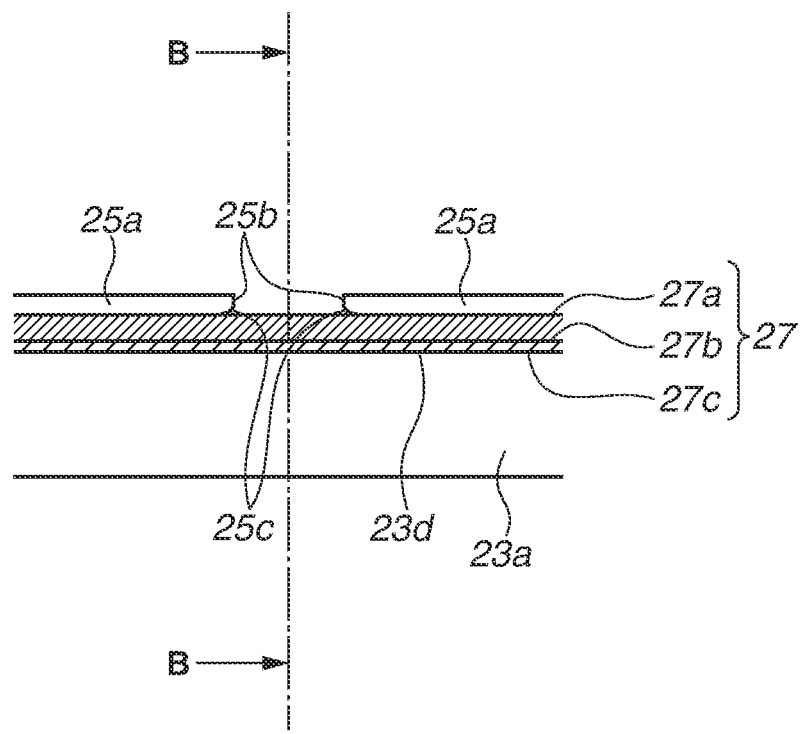

In FIGS. 7A and 7B, a driven body 23 only includes an annular rotor 23a made of an elastic member, and a pressing spring rubber 27 and a pressing spring 25 are attached to a top surface of the rotor 23a.

The pressing spring 25 is made of an elastic member by press working, and includes plate spring parts 25a and a plurality of slits 25b provided in the rotational direction of the vibration wave motor. Further, a relief part 25c caused by shear droop through press working is provided at a corner (corner of pressing spring 25) on the pressing spring rubber 27 side (intervention member side) of each of the plate spring parts 25a.

The pressing spring rubber 27 is made of a butyl rubber, a silicone rubber, or the like high in vibration damping performance, suppresses generation of unnecessary vibration of the rotor 23a while the vibration wave motor is driven, and prevents noise and output reduction of the vibration wave motor.

A top surface 27a of the pressing spring rubber 27 abuts on the pressing spring 25. Further, an adhesive is applied to a bottom surface 27b of the pressing spring rubber 27 over the entire circumference in the rotational direction, an adhesive part 27c is provided between the bottom surface 27b and a top surface 23d of the rotor 23a of the driven body 23, and the pressing spring rubber 27 and the rotor 23a are firmly fixed. Fixing force in the rotational direction (relative moving direction) of the adhesive part 27c is larger than friction force in the rotational direction between the pressing spring 25 and the top surface 27a of the pressing spring rubber 27 abutting on the pressing spring 25, as with the first exemplary embodiment. Further, the fixing force is larger than friction force between a vibrator 22 and the driven body 23.

As a result, even when the external force forcibly rotating the vibration wave motor acts on the driven body 23, the pressing spring rubber 27 is hardly slid in the rotational direction, and it is possible to prevent the pressing spring rubber 27 from protruding from the slits 25b of the pressing spring 25.

Further, when the forcible external force acts on the driven body 23, sliding of the pressing spring rubber 27 in the rotational direction is prevented; however, the pressing spring 25 may rotate relative to the pressing spring rubber 27 (pressing spring 25 may be slid on pressing spring rubber 27). In the present exemplary embodiment, the relief parts 25c are provided on the pressing spring 25 (corners are lacked). Accordingly, it is possible to prevent the pressing spring rubber 27 from being damaged by the corners of the pressing spring 25 and to prevent a part of the pressing spring rubber 27 from being caught by the corners and protruding from the slits. This makes it possible to maintain stable pressing of the vibration wave motor.

In the present exemplary embodiment, the relief parts 25c of the pressing spring 25 are formed in an R-shape by shear droop through press working; however, the relief parts 25c are not limited thereto. For example, the relief parts may be formed by rounding the corners, or side etching is generated by etching processing to form relief parts removed in a circular arc shape.

As a fourth exemplary embodiment, a configuration example of a vibration wave motor in a mode different from the modes according to the above-described exemplary embodiments is described with reference to FIG. 8. The present exemplary embodiment is different from the first exemplary embodiment in that the pressing spring and the pressing spring rubber have a structure illustrated in FIG. 8. The other elements according to the present exemplary embodiment are the same as the corresponding elements according to the first exemplary embodiment described above. Accordingly, description of the elements is omitted by assigning the same reference numerals to the elements.

Figure 8:
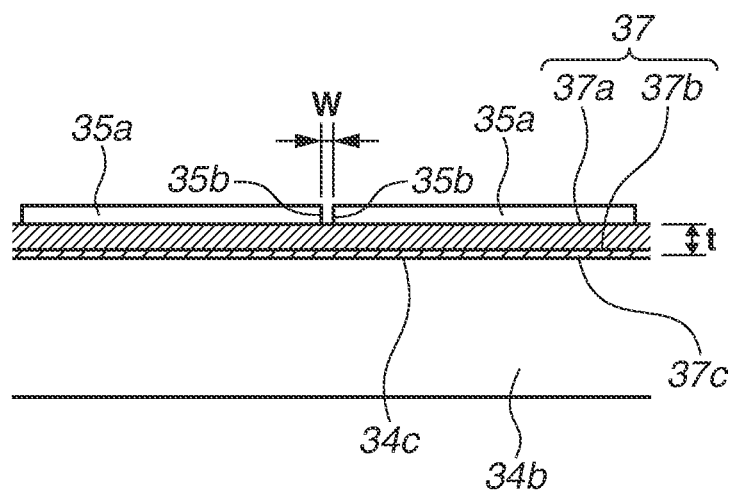
FIG. 8 is a side enlarged view of a vibration wave motor according to a fourth exemplary embodiment of the present invention.

FIG. 8 is a side enlarged view of the vibration wave motor according to the present exemplary embodiment as viewed from a side surface of the vibration wave motor.

In FIG. 8, a pressing spring 35 is made of an elastic member, and includes plate spring parts 35a and a plurality of slits 35b provided in the rotational direction of the vibration wave motor.

A pressing spring rubber 37 is provided between the pressing spring 35 and a weight member 34b of a driven body 33 in the pressing direction, and a top surface 37a of the pressing spring rubber 37 abuts on the pressing spring 35.

An adhesive part 37c is provided on a bottom surface 37b of the pressing spring rubber 37, and the pressing spring rubber 37 and a top surface 34c of the weight member 34b are firmly fixed. Accordingly, as with the first exemplary embodiment, even when the external force forcibly rotating the vibration wave motor acts on the driven body 33, the pressing spring rubber 37 is hardly slid in the rotational direction, and it is possible to prevent the pressing spring rubber 37 from protruding from the slits 35b of the pressing spring 35.

Further, the width W of each of the slits 35b of the pressing spring 35 in the rotational direction is made less than twice the thickness t of the pressing spring rubber 37 in the pressing direction. Therefore, even when the vibration wave motor is exposed to high-temperature environment for a long time, the fixing force of the adhesive part 37c is reduced, and the pressing spring rubber 37 is slid in the rotational direction by the forcible external force, it is possible to prevent the pressing spring rubber 37 from protruding from the slits 35b because the width of each of the slits 35b is narrow. This makes it possible to maintain stable pressing of the vibration wave motor.

In a fifth exemplary embodiment, a configuration of an industrial robot as an example of an apparatus (machine) including the vibration wave motor according to any of the above-described exemplary embodiments is described.

Figure 9:
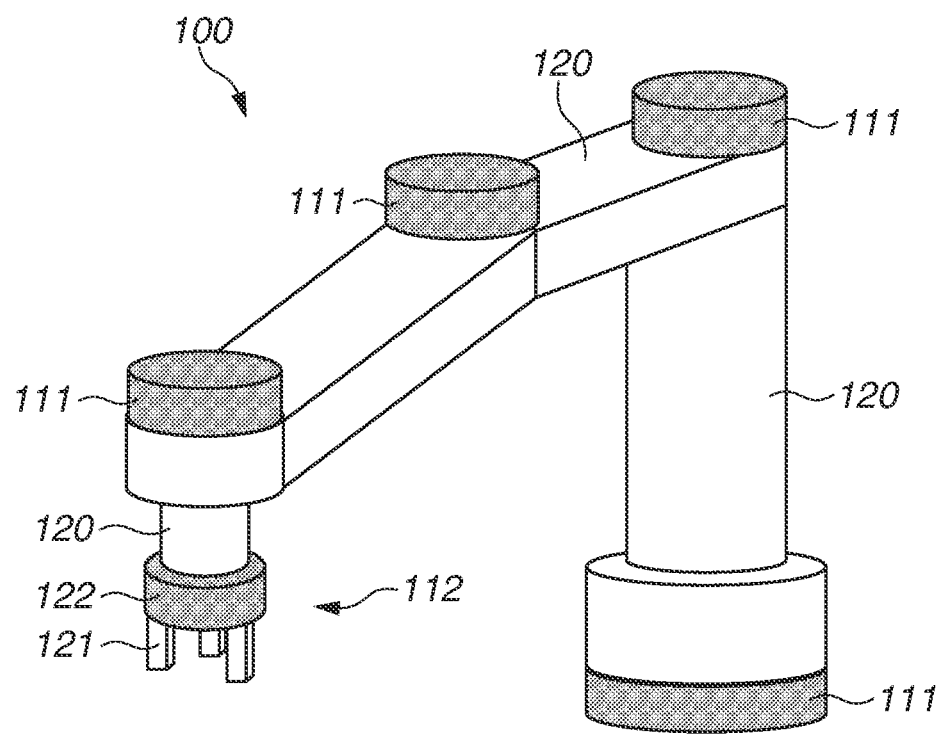
FIG. 9 is a perspective view illustrating a schematic configuration of a robot mounted with the vibration wave motor according to any of the exemplary embodiments of the present invention.

FIG. 9 is a perspective view illustrating a schematic configuration of a robot 100 mounted with the vibration wave motor, and illustrates a horizontal articulated robot that is one kind of the industrial robot. The vibration wave motor is incorporated in an arm joint unit 111 and a hand unit 112 of the robot 100. The arm joint unit 111 connects at least two arms 120 so as to change an intersection angle of the two arms 120. The hand unit 112 includes the arm 120, a holding part 121 attached to one end of the arm 120, and a hand joint unit 122 that connects the arm 120 and the holding part 121. The vibration wave motor is used in the arm joint unit 111 that changes the intersection angle of the arms 120, and in the hand joint unit 122 that rotates the holding part 121 by a predetermined angle.

In a sixth exemplary embodiment, a configuration of a camera platform apparatus (turning apparatus) is described as an example of an apparatus including at least two vibration wave motors according to any of the above-described exemplary embodiment.

Figure 10A:
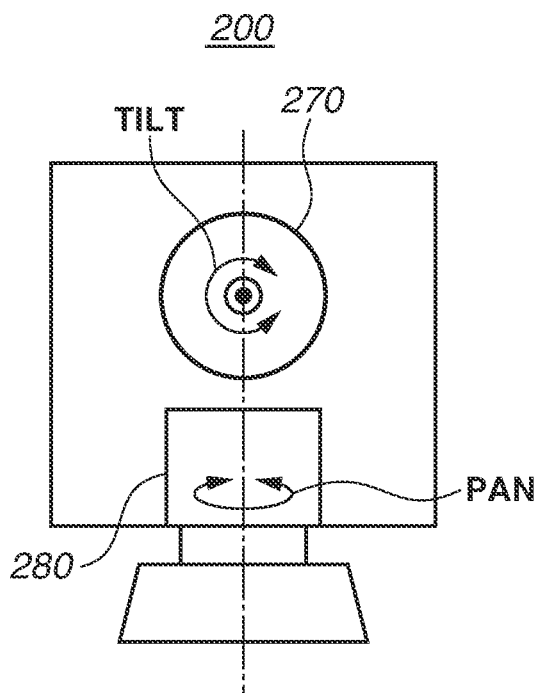
FIGS. 10A and 10B are diagrams illustrating a schematic configuration of a camera platform mounted with the vibration wave motor according to any of the exemplary embodiments of the present invention, where
Figure 10B:
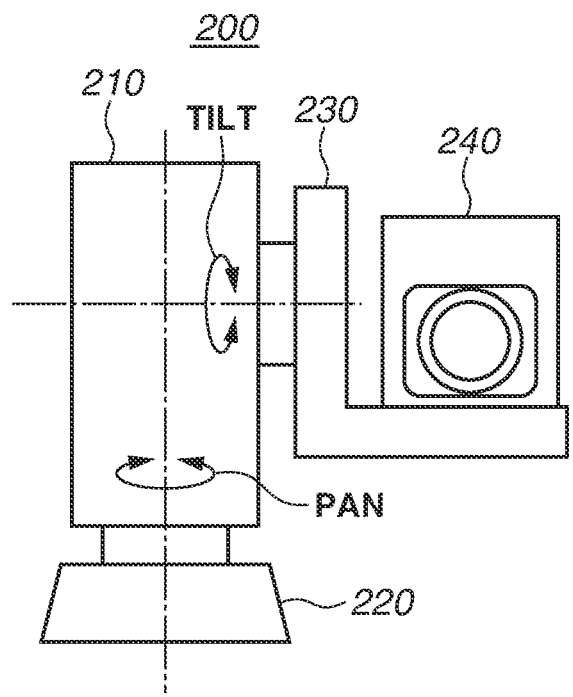
Figure 11A:
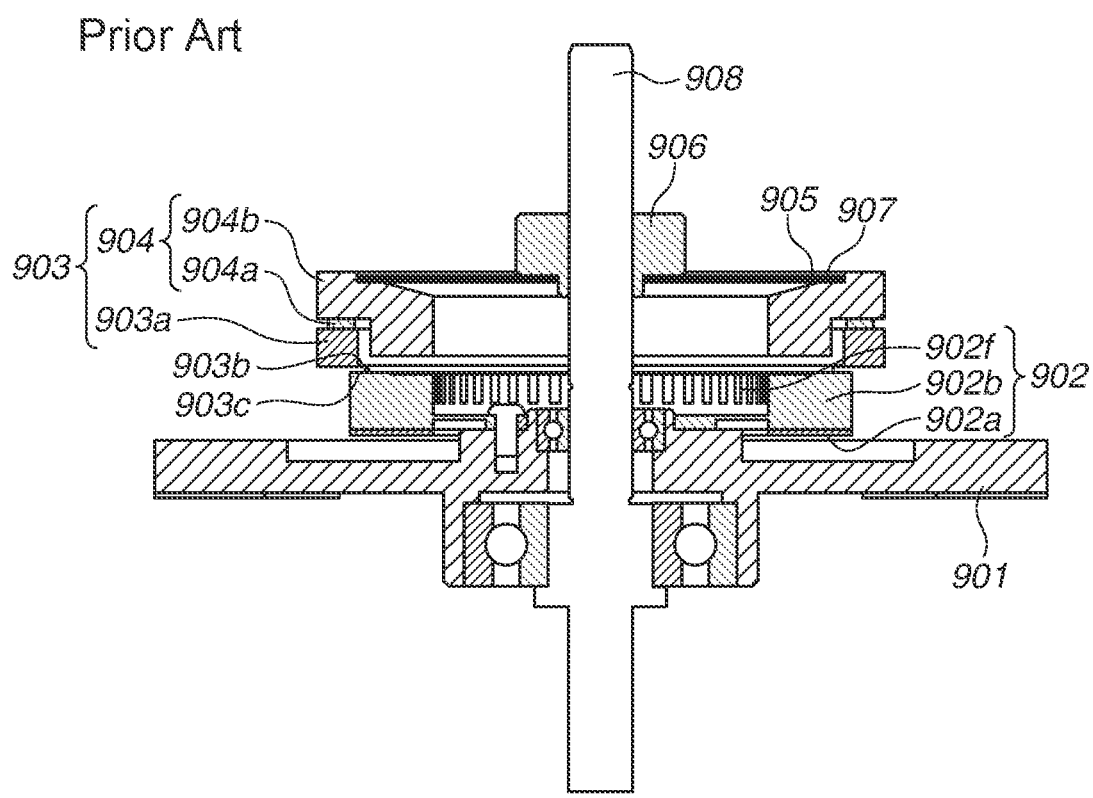
FIGS. 11A and 11B are diagrams illustrating a configuration of a vibration wave motor according to an existing example, where
Figure 11B:
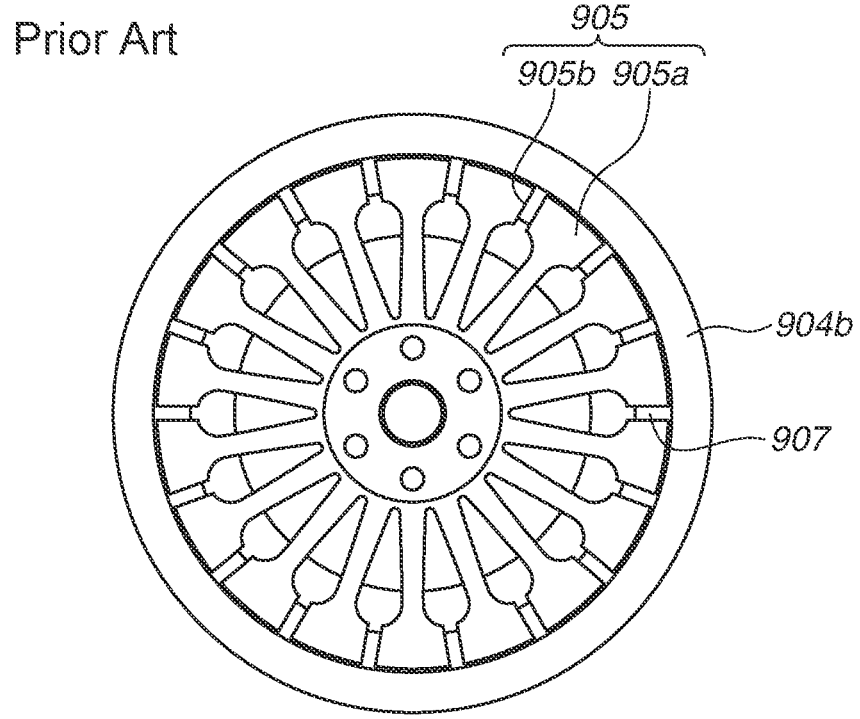

FIG. 10A is an appearance front view of a camera platform 200, and FIG. 10B is a side view illustrating an inside of the camera platform 200.

The camera platform 200 includes a head unit 210, a base unit 220, an L-angle unit 230 coupled to the head unit 210, and an imaging apparatus 240.

Two vibration wave motors according to any of the above-described exemplary embodiments are disposed inside the head unit 210.

An output part of a panning vibration wave motor 280 is coupled to the base unit 220, and the head unit 210 is panned (rotated) relative to the base unit 220 by rotational driving of the vibration wave motor 280. An output part of a tilting vibration wave motor 270 is coupled to the L-angle unit 230, and the L angle unit 230 is tilted (rotated) relative to the base unit 220 by rotational driving of the vibration wave motor 270.

The imaging apparatus 240 attached to the L-angle unit 230 is a camera that captures a moving image and a still image, and can be panned or tilted by driving of the two vibration wave motors while performing imaging. Further, since the vibration wave motor can maintain an attitude by the friction force in a non-energized state, energization of the vibration wave motor is stopped after the attitude of the camera platform is determined, and imaging can be continued while the power consumption is suppressed. In the camera platform apparatus 200 according to the present exemplary embodiment, the imaging apparatus 240 is mounted on the L-angle unit 230; however, the configuration of a mounted object is not limited thereto, and can be appropriately changed.

Although the present invention has been described in detail based on the exemplary embodiments, the present invention is not limited to these specific exemplary embodiments, and various modes not departing from the scope of the present invention are also included in the present invention. Further, each of the above-described exemplary embodiments merely illustrates an exemplary embodiment of the present invention, and the exemplary embodiments can be appropriately combined.

According to the exemplary embodiments of the present invention, it is possible to provide the vibration wave motor that includes the plurality of pressing parts separated by the slits, and can prevent the intervention member from protruding from the slits.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-107371, filed Jun. 7, 2019, which is hereby incorporated by reference herein in its entirety.

What is claimed is:

1. A vibration wave motor, comprising:
   a vibrator;
   a driven body configured to be brought into pressure contact with the vibrator and to move relative to the vibrator;
   a pressing member configured to move together with the driven body and to bring the driven body into pressure contact with the vibrator; and
   an intervention member intervening between the driven body and the pressing member, and configured to be pressed together with the driven body when the pressing member brings the driven body into pressure contact with the vibrator,
   wherein the pressing member includes a plurality of pressing parts that is separated by slits and presses the intervention member, and
   wherein the intervention member is firmly fixed to the driven body.

2. The vibration wave motor according to claim 1, wherein fixing force between the intervention member and the driven body in a relative moving direction in which the driven body moves relative to the vibrator is larger than friction force between the vibrator and the driven body in the relative moving direction.

3. The vibration wave motor according to claim 1, wherein fixing force between the intervention member and the driven body in a relative moving direction in which the driven body moves relative to the vibrator is larger than friction force between the pressing member and the intervention member in the relative moving direction.

4. The vibration wave motor according to claim 1, wherein a main component of the intervention member is a rubber.

5. A turning apparatus, comprising:
   a base unit;
   a head unit coupled to the base unit; and
   an L-angle unit coupled to the head unit,
   wherein the head unit includes the vibration wave motor according to claim 1, and
   wherein the head unit and the L-angle unit are rotated by the vibration wave motor by a predetermined angle relative to the base unit.

* * * * *